United States Patent
El Choubassi et al.

(10) Patent No.: US 10,477,181 B2
(45) Date of Patent: Nov. 12, 2019

(54) MULTIVIEW VIDEO STABILIZATION

(71) Applicant: INTEL CORPORATION, Santa Clara, CA (US)

(72) Inventors: Maha El Choubassi, San Jose, CA (US); Fan Zhang, San Mateo, CA (US); Joshua J. Ratcliff, San Jose, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 14/971,837

(22) Filed: Dec. 16, 2015

(65) Prior Publication Data
US 2017/0180699 A1 Jun. 22, 2017

(51) Int. Cl.
H04N 13/00 (2018.01)
H04N 5/232 (2006.01)
H04N 13/144 (2018.01)
H04N 13/128 (2018.01)
H04N 13/296 (2018.01)
H04N 13/282 (2018.01)
H04N 13/243 (2018.01)

(52) U.S. Cl.
CPC ....... H04N 13/144 (2018.05); H04N 5/23267 (2013.01); H04N 13/128 (2018.05); H04N 13/243 (2018.05); H04N 13/282 (2018.05); H04N 13/296 (2018.05); H04N 2013/0081 (2013.01)

(58) Field of Classification Search
CPC ........... H04N 13/0468; H04N 13/0033; H04N 13/00; H04N 5/232
USPC .................... 348/43, 51, 46, 208.6
See application file for complete search history.

(56) References Cited

U.S. PATENT DOCUMENTS

| | | | |
|---|---|---|---|
| 9,131,155 B1* | 9/2015 | Dolgin | H04N 5/23248 |
| 2013/0010073 A1 | 1/2013 | Do et al. | |
| 2013/0127993 A1 | 5/2013 | Wang | |
| 2014/0037192 A1 | 2/2014 | El Dokor et al. | |
| 2014/0313295 A1* | 10/2014 | Dolim | H04N 13/0468 348/51 |
| 2015/0146029 A1 | 5/2015 | Venkataraman et al. | |

FOREIGN PATENT DOCUMENTS

WO  2014031795  2/2014

OTHER PUBLICATIONS

Banks, M.S. et al., "Stereoscopy and the human visual system." In Proc of the Second International Conference on Stereoscopic 3D for Media and Entertainment, New York, NY,USA, 2012.

Liu et al., "Content-preserving warps for 3D video stabilization," ACM Transactions on Graphics (TOG), Proceedings of ACM SIGGRAPH 2009, vol. 28, No. 3, pp. 1-9, Aug. 2009.

(Continued)

Primary Examiner — Albert Kir
(74) Attorney, Agent, or Firm — Green, Howard & Mughal LLP.

(57) ABSTRACT

Techniques related to multiview video stabilization are discussed. Such techniques may include performing single view video stabilization on a reference video stream and propagating the single view video stabilization to another video stream based on a target disparity map.

22 Claims, 7 Drawing Sheets

(56) References Cited

OTHER PUBLICATIONS

Liu et al., "Subspace video stabilization," ACM Transactions on Graphics (TOG), vol. 30, No. 1, pp. 1-10, 2011.
Liu et al., "Joint subspace stabilization for stereoscopic video," Proceedings of IEEE International Conference on Computer Vision (ICCV), 8 pages, Dec. 1-8, 2013.
Stefanoski et al., "Automatic view synthesis by image-domain-warping," IEEE Transactions on Image Processing, vol. 22, No. 9, pp. 3329-3341, Sep. 2013.
Tyler et al., "3D discomfort from vertical and torsional disparities in natural images," Proceedings of 17th SPIE Human Vision Electron. Imaging, vol. 8291, pp. 82910Q-1-82910Q-9, Jan. 2012.
Popovic et al., "Real-time implementation of Gaussian image blending in a spherical light field camera," IEEE International Conference on Industrial Technology, pp. 1173-1178, Feb 25-28, 2013.
Zhang et al., "Parallax-tolerant image stitching," IEEE Conference on Computer Vision and Pattern Recognition (CVPR), 8 pages, Jun. 23-28, 2014.
International Search Report and Written Opinion for International Patent Application PCT/US2016/061005, dated Feb. 20, 2017.
International Preliminary Report on Patentability for PCT Application No. PCT/US16/61006, dated Jun. 28, 2018.

\* cited by examiner

MULTIVIEW VIDEO STABILIZATION

BACKGROUND

Lightfield/plenoptic cameras and multicamera arrays are capable of providing impressive and unusual experiences, turning pictures and videos into more creative media. For example, instead of being just a still image, images from such systems may include parallax effects showing views from different perspectives, provide focus/defocus at specific depth layers, and the like. In other examples, bullet effect videos may be generated with camera arrays. In still other examples, spherical panoramas (still or video) may be generated with spherical light field cameras. Furthermore, head mounted displays may provide immersive experiences for content acquired by such camera systems.

Consequently, lightfield cameras and displays, multicamera arrays, and multiview video are becoming popular and may become prevalent. Similar to single view video, multiview video may be captured by handled devices such that the multiview video is jittery and inadequate for viewing particularly in immersive head mounted display and/or lightfield display environments.

Current techniques may be inadequate for performing high quality and/or efficient multiview video stabilization. It is with respect to these and other considerations that the present improvements have been needed. Such improvements may become critical as the desire to provide multiview video in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
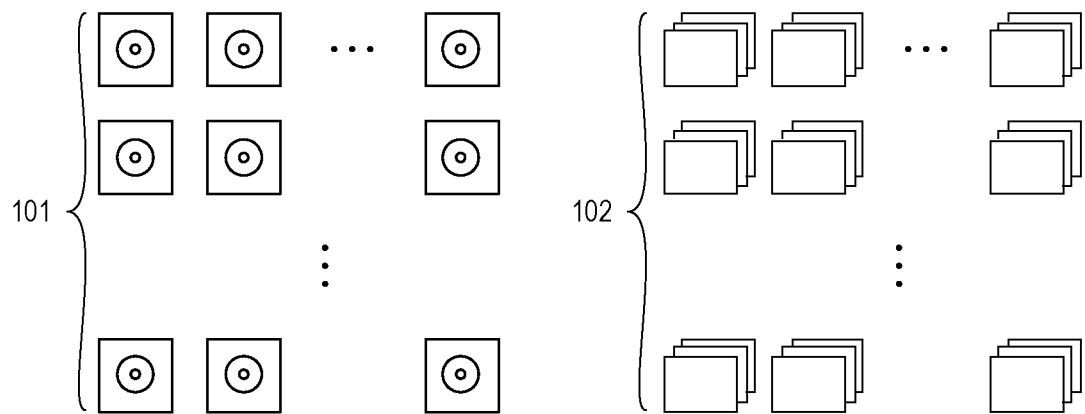
FIG. 1 illustrates an example camera array and example multiview video.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to multiview video stabilization and, in particular, to propagating single view video stabilization to other views of the multiview video.

As described above, multiview video may be captured by handled devices such that the multiview video is jittery and inadequate for viewing. Stabilization of such multiview video may be imperative for the user enjoyment of such video in some contexts. Furthermore, applications using or involving multiview video (e.g., stitching spherical video panoramas) may require multiview video to be stabilized such that the raw input to the applications is stabilized. Such preprocessing may improve the resultant quality of the output from such applications. The techniques discussed herein provide high quality multiview video stabilization results and may provide for consistently stabilized multiview video, which may be provided as preprocessing for other applications and/or as processing prior to presenting multiview video to a user. The resultant multiview video may be stabilized such that it does not strain the human visual system for example.

In some embodiments, providing multiview video stabilization may include performing single view video stabilization on a reference video stream to generate a stabilized reference video stream. The reference stream may be any stream of the multiview video for example. The single view video stabilization may be propagated to one or more other video streams of the multiview video by generating a target disparity map by applying a stabilization transform corresponding to the single video stabilization to an initial disparity map for a frame of the reference video and a synchronized frame of the other video stream and by minimizing at least a vertical component or a horizontal component of the target disparity map and performing video stabilization on the second video stream based on the target disparity map to generate another stabilized video stream. For example, the vertical or horizontal component may be perpendicular to an interpupillary axis or expected interpupillary axis of a viewer of the video and the minimization of the vertical or horizontal component may include setting the component to zero.

Such techniques may provide multiview video stabilization for any number of video streams. Furthermore, in some embodiments, multiview video stabilization may be performed in stages such that multiview video stabilization may be propagated from a first reference video stream to one or more secondary reference video streams for other regions of the multiview video and video stabilization may be propagated from each of secondary reference video streams to the other video streams in the region of each particular secondary reference video stream.

FIG. 1 illustrates an example camera array 101 and example multiview video 102, arranged in accordance with at least some implementations of the present disclosure. As shown in FIG. 1, camera array 101 may include any number of cameras for attaining synchronous multiview video 102, which may have a corresponding number of video streams. As used herein with respect to multiview video, the term synchronous is used to indicate that the video streams of the multiview video each include video frames that are synchronized or substantially synchronized (e.g., provided at the same or substantially the same time). Camera array 101 may include any suitable number of cameras and an associated number of video streams may be attained. In various examples, camera array includes 9 cameras (e.g., in a 3×3 grid) 16 cameras (e.g., in a 4×4 grid), and so on such that any number of cameras up to 400 cameras or more may be provided. Furthermore, in the illustrated example, camera array 101 may include cameras evenly spaced and arranged in a grid pattern around a center; however, camera array 101 may include any suitable arrangement and spacing. For example, the cameras of camera array 101 may not be evenly spaced, may be arranged in another pattern (e.g., circularly, in a rectangle, only along a horizontal line, only along a vertical line, or the like). Furthermore, although illustrated with respect to camera array 101, multiview video 102 including multiple video streams may be attained using any suitable system such as a lightfield/plenoptic camera or the like.

For example, the techniques discussed herein may provide, for an input of N video streams captured synchronously by a camera array such as camera array 101 or a lightfield camera, an output of N video streams that are consistently stabilized. Such stabilization may be provided such that eye fatigue for a viewer of the multiview video is avoided or mitigated. For example, a user may be provided smooth and stabilized camera array or lightfield content based on the processing discussed herein as opposed to originally attained camera array or lightfield content, which may be jittery. In other contexts, such stabilization may be preprocessing stabilization that provides high quality synchronized and stabilized video for use by a multiview video application or the like.

Figure 2:
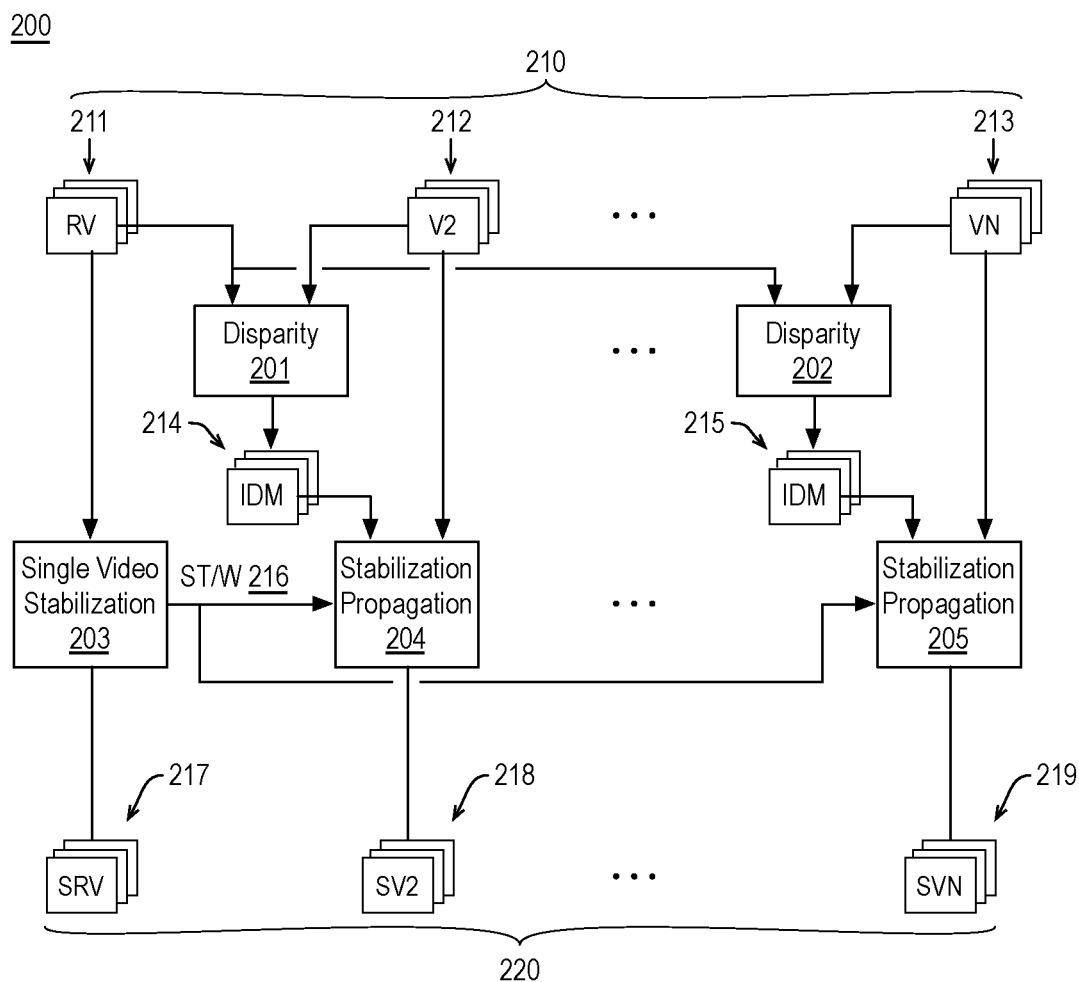
FIG. 2 illustrates an example device for providing multiview video stabilization.

FIG. 2 illustrates an example device 200 for providing multiview video stabilization, arranged in accordance with at least some implementations of the present disclosure. As shown in FIG. 2, device 200 may include a disparity module 201, a disparity module 202, a single video stabilization module 203, a stabilization propagation module 204, and a stabilization propagation module 205. Device 200 may include any number of disparity modules and stabilization propagation modules to propagate single video stabilization performed by single video stabilization module 203 as discussed herein. For example, for N video streams, device 200 may include N–1 disparity modules and N–1 stabilization propagation modules. However, in some embodiments, parallel processing or the like may reduce the number of needed modules. For example, any number of modules that may provide the disparity maps and stabilization propagation as discussed herein may be provided in device 200.

Device 200 may be any suitable form factor device. For example, device 200 may be a computer, a laptop computer, a tablet, a smart phone, a phablet, digital camera, a display device, a gaming device, a wearable device such as a head mounted device, smart glasses, a smart watch, or the like. In an example, device 200 may implement a video pipeline to generate stabilized multiview video. In some examples, device 200 may implement or include a camera array or lightfield camera or the like, which may generate multiview video such as multiview video 102. In other examples, device 200 may receive multiview video such as multiview video 102 from another device or system. As the terms are used herein, device 200 may be characterized as a device, a system, a multiview video stabilization system, or the like.

As shown, device 200 may generate, receive or otherwise attain input multiview video 210, which may include any number of synchronized input video streams such as video streams 211, 212, 213. Video streams 211, 212, 213 may be in any suitable format and may each include frames that are synchronized across video streams 211, 212, 213. Also as shown, device 200 may select one of the video streams of multiview video 210 as a reference video stream. For example, a controller (not shown) of device 200 may select a video stream of video streams 211, 212, 213 as a reference video stream. In the example of FIG. 2, video stream 211 is selected as the reference video stream (RV). In an embodiment, the reference video stream is selected as a top left video stream of multiview video 210; however, any video stream may be selected such as another corner video stream, a center or central video stream or the like. Other video streams may be stabilized with respect to a stabilization of reference video stream 211 as is discussed further herein.

Such other video streams may be characterized or labeled as video streams V2 (video stream 212), V3 (not shown), ... , VN (video stream 213).

Single view stabilization module 203 may receive reference video stream 211 and single view stabilization module 203 may perform single view stabilization on reference video stream 211 to generate stabilized reference video stream (SRV) 217. Single view stabilization module 203 may perform such single view stabilization using any suitable technique or techniques. In an embodiment, the single view stabilization includes a 2D stabilization technique. Such a stabilization technique may offer the advantage of providing relatively low computational complexity. In another embodiment, the single view stabilization includes a subspace stabilization technique, which may provide a balance of computational efficiency and quality of stabilization particularly for textured scenes.

Furthermore, the single view stabilization performed for reference video stream 211 may be propagated to the other video streams of multiview video 210 such as exemplary video streams 212 (labeled video 2) and 213 (labeled video N). Such stabilization propagation may provide consistent propagation from the reference video to remaining videos obeying constraints for high quality depth perception as is discussed further herein. For example, as shown, disparity module 201 may determine initial disparity maps (IDM) 214 for reference video stream 211 and video stream 212 and disparity module 202 may determine initial disparity maps (IDM) 215 for reference video stream 211 and video stream 213. Similarly, additional disparity modules may determine initial disparity maps for reference video and any other video streams. For example, initial disparity maps 214 include a disparity map for or between each set of two individual, synchronized frames of reference video stream 211 and video stream 212 such that at time, t, a disparity map is provided for or between the frame of reference video stream 211 at time, t, and the frame of video stream 212 at time, t. Similarly, initial disparity maps 215 include a disparity map for or between each set of two individual, synchronized frames of reference video stream 211 and video stream 212.

Initial disparity maps 214, 215, and any additional initial disparity maps may be provided using any suitable technique or techniques. For example, such techniques may include stereo matching techniques, optical flow techniques, or the like. In an embodiment, such initial disparity maps may be provided via an image or video preprocessing pipeline of device 200. Initial disparity maps may have the same resolution as video streams of multiview video 210 or the resolution of the initial disparity maps may be lower with respect to video streams of multiview video 210.

Also as shown, the single view stabilization performed for reference video stream 211 may be characterized by a stabilization transform/warp (ST/W) signal 216, which may be provided to stabilization propagation modules such as stabilization propagation modules 204, 205. Stabilization transform/warp signal 216 may include any suitable data structure, transform map, warp, warp map, or the like that indicates the transform for each frame of reference video stream 211 to each corresponding frame of stabilized reference video stream 217. For example, stabilization transform/warp signal 216 may indicate motion of feature points between a frame of reference video stream 211 and a frame of stabilized reference video stream 217 as is discussed further herein.

Stabilization propagation modules such as stabilization propagation modules 204, 205 may receive corresponding video streams of input multiview video 210, corresponding initial disparity maps, and stabilization transform/warp signal 216, and such stabilization propagation modules may generate corresponding stabilized video streams of stabilized multiview video 220. For example, stabilization propagation module 204 may receive video stream 212, initial disparity maps 214, and stabilization transform/warp signal 216, and stabilization propagation module 204 may generate stabilized video stream 218. Similarly, stabilization propagation module 205 may receive video stream 213, initial disparity maps 215, and stabilization transform/warp signal 216, and stabilization propagation module 205 may generate stabilized video stream 219. As discussed, any number of such stabilization propagation modules may be provided via device 200 for any number of video streams of input multiview video 210.

For example, the single view stabilization propagation from reference video stream 211 to other video streams of multiview video 210 may be performed with sensitivity to the vision system of a user that may eventually view stabilized multiview video 220. With respect to human discomfort, human stereopsis is sensitive to vertical disparity (e.g., disparity perpendicular to the interpupillary axis). For example, vertical disparities greater than 15 arcminutes, even briefly, may induce discomfort in viewers of multiview video. To propagate stabilization from reference video stream 211 to other video streams of multiview video 210 that reduces or eliminates such disparity and user discomfort, the propagation techniques discussed herein may incorporate constraints such as stereoscopic constraints. For example, such constraints may, at least partially, preserve a horizontal (or vertical) disparity map component and set to zero or minimize a vertical (or horizontal) disparity map component. Using such constraints, the original geometric relationship among the multiview may be effectively preserved and undesired stereoscopic disparities may be removed or reduced.

Figure 3:
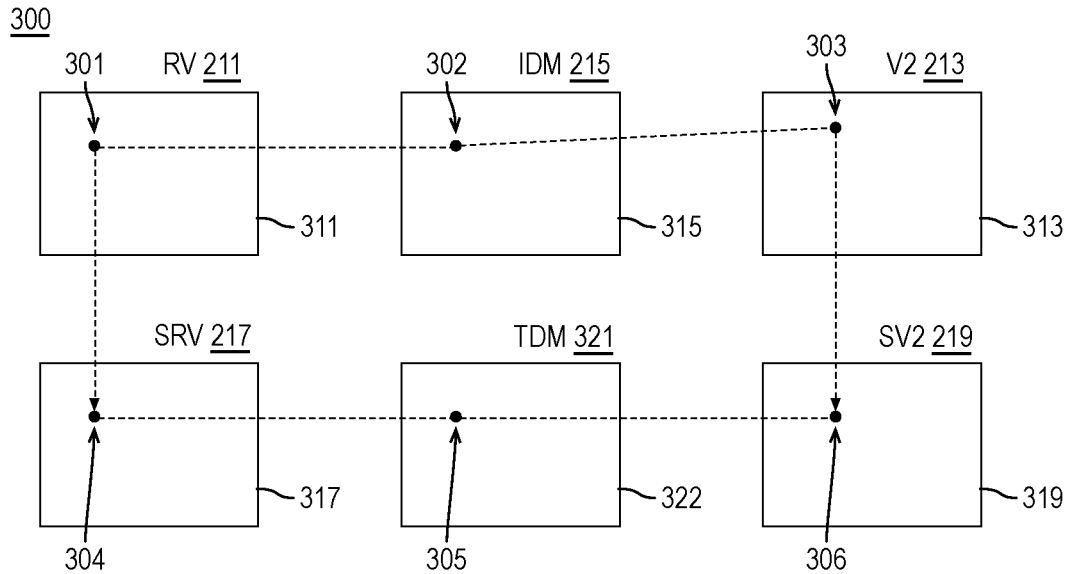
FIG. 3 illustrates an example multiview stabilization for synchronized frames.

FIG. 3 illustrates an example multiview stabilization for synchronized frames 300, arranged in accordance with at least some implementations of the present disclosure. As shown in FIG. 3, synchronized frames 300 may include a frame 311 of reference video stream 211, a frame 315 of initial disparity maps 215, a frame 313 of video stream 213, a frame 317 of stabilized reference video stream 217, a frame 322 of target disparity maps 321, and a frame 319 of a stabilized video stream 219 (SV2) corresponding to video stream 213 (please refer to FIG. 1).

For example, stabilization propagation may be performed between reference video stream 211, characterized as $V_1$, and any other video stream such as video stream 213, characterized as $V_2$. As discussed, initial disparity maps 215 between video stream 211 and video stream 213 may be received or generated. Such initial disparity maps 215 may be characterized as D. As discussed with respect to single video stabilization module 203 of FIG. 2, single view stabilization may be performed for reference video stream 211, $V_1$, using any suitable single view video stabilization techniques to provide stabilized reference video stream 217, which may be characterized as $\hat{V}_1$. For example, for each feature point, $p_i^1$, such as feature point 301 in reference video stream 211, $V_1$, the single view video stabilization may determine a target position, $\hat{p}_i^1$, such as target position or feature point 304 in stabilized reference video stream 217, $\hat{V}_1$. For example, feature point 301 of frame 311 may correspond to feature point 304 of frame 317 such that the transform map or warping function between frame 311 and frame 317 translates feature point 301 to feature point 304

(along with any number of other feature points). For example, the mapping between reference video stream 211, $V_1$ and stabilized reference video stream 217, $\hat{V}_1$, may be represented by stabilization transform/warp signal 216 as discussed herein.

To propagate the stabilization of reference video stream 217 (e.g., from $V_1$ to $\hat{V}_1$) to any other video stream such as video stream 213 (e.g., $V_2$), guidance from a disparity map may be used. However, the stabilization of reference video stream 211, $V_1$ has transformed its shape and the original disparity map D may no longer match stabilized reference video stream 217, $\hat{V}_1$. To support stabilization propagation, the transform map or warping function (e.g., as indicated by stabilization transform/warp signal 216) that transformed stabilization of reference video stream 211, $V_1$, to stabilized reference video stream 217, $\hat{V}_1$, may be applied (e.g., by any of the stabilization propagation modules) on an initial disparity map of initial disparity maps 215, D, to generate a target disparity map (e.g., frame 322) of target disparity maps 321, which may be characterized as $\hat{D}$. Furthermore, in generating target disparity maps 321, $\hat{D}$, or in generating target disparity vectors based on target disparity maps 321, $\hat{D}$, a horizontal or vertical component of the target disparity map may be minimized (e.g., set to zero or a small number or the like) as is discussed further below.

As discussed, feature points, $p_i^1$, such as feature point 301 in stabilized reference video stream 217, $V_1$, may be detected (e.g., such features may be Harris corners or scale-invariant feature transform (SIFT) points or the like). In stabilized reference video stream 217, $\hat{V}_1$, corresponding feature points, $\hat{p}_i^1$, such as feature point 304 may be the corresponding, stabilized feature points in stabilized reference video stream 217, $\hat{V}_1$, for example. Furthermore, feature points, $p_i^2$, in video stream 213, $V_2$, such as feature point 303 may correspond to feature points, $p_i^1$, in reference video stream 211, $V_1$, such as feature point 301. For example, feature point 303 may be a translation of feature point 301 made with respect to a disparity vector 302 of initial disparity maps 215. To generate the locations of feature points, $\hat{p}_i^2$, in stabilized video 219, which may be characterized as $\hat{V}_2$, such as feature point 306, each feature point pair, $(\hat{p}_i^1, \hat{p}_i^2)$, of reference stabilized video 217, $\hat{V}_1$, and stabilized video 219, $\hat{V}_2$, may be encouraged to respect an optimal target disparity vector, $\hat{d}_i$, such as a disparity value or disparity vector 305 of target disparity maps 321. For example, if reference video stream 211 and video stream 213 are horizontally aligned, as in the example of FIG. 3, $\hat{d}_i = [\hat{d}_i \ 0]^T$ such that $\hat{d}_i$ is the target horizontal disparity (after warping) and the vertical disparity is set to 0 (or some other minimal amount). If reference video stream 211 and video stream 213 are vertically aligned, $\hat{d}_i = [0 \ \hat{d}_i]^T$ such that $\hat{d}_i$ is the target vertical disparity (after warping) and the horizontal disparity is set to 0 (or some other minimal amount). If reference video stream 211 and video stream 213 are diagonal with respect to one another, $\hat{d}_i = [\hat{d}_{i,h} \ \hat{d}_{i,v}]^T$ such that $\hat{d}_{i,h}$ is the target horizontal disparity and $\hat{d}_{i,v}$ is the target vertical disparity (after warping).

Furthermore, for the determination of the locations of feature points, $\hat{p}_i^2$, in stabilized video 219, an energy term may be defined as shown in Equation (1):

$$E_d = \Sigma_{\hat{p}_i^2} \|\hat{p}_i^2 - \hat{p}_i^1 - \hat{d}_i\|^2 \quad (1)$$

where $E_d$ may be the energy term for maintaining proximity between feature point 306, $\hat{p}_i^2$, and feature point 304 as adjusted by the target disparity vector, $\hat{d}_i$ (e.g., $\hat{p}_i^1 + \hat{d}_i$). For example, energy term, $E_d$, may be a data energy input or the like, which may be combined with other inputs (e.g., energy terms) and the overall energy may be minimized or the like to determine the locations of feature points, $\hat{p}_i^2$, in stabilized video stream 219, $\hat{V}_2$, such as feature point 306. For example, such other inputs or energy terms may provide other constraints such as global constraints (e.g., to limit distortion) or the like.

Such determination of the locations of feature points, $\hat{p}_i^2$, in stabilized video 219, $\hat{V}_2$, such as feature point 306 may be performed by a stabilization propagation module such as stabilization propagation module 205, for example. The output of such processing may be the locations of stabilized feature points for stabilized video stream 219, $\hat{V}_2$. Based on such feature points, video stream 213, $V_2$, may be warped or transformed or the like to generate stabilized video stream 219, $\hat{V}_2$. Such a warp or transformation may be performed using any suitable technique or techniques such as a content-preserving warping technique or the like. Furthermore, the sequences of stabilized feature points, $\hat{p}_i^2$, across frames may constitute or provide a set of stabilized trajectories across the stabilized frames of stabilized video stream 219, $\hat{V}_2$. Such trajectories may be tracked or modified or the like to improve the robustness of the warping of video stream 213.

Returning to FIG. 2, as discussed, any number of stabilization propagation modules such as stabilization propagation modules 204, 205 may generate any number of stabilized video streams such as stabilized video streams 218, 219 of stabilized multiview video 220. Stabilized multiview video 220 may be provided by device 200 for any suitable purpose. For example, stabilized multiview video 220 may be presented to a user (e.g., via a display of device 200), transmitted to another component or module of device 200 for further processing, transmitted to a remote device for presentment or further processing, saved to memory, or the like.

Figure 4:
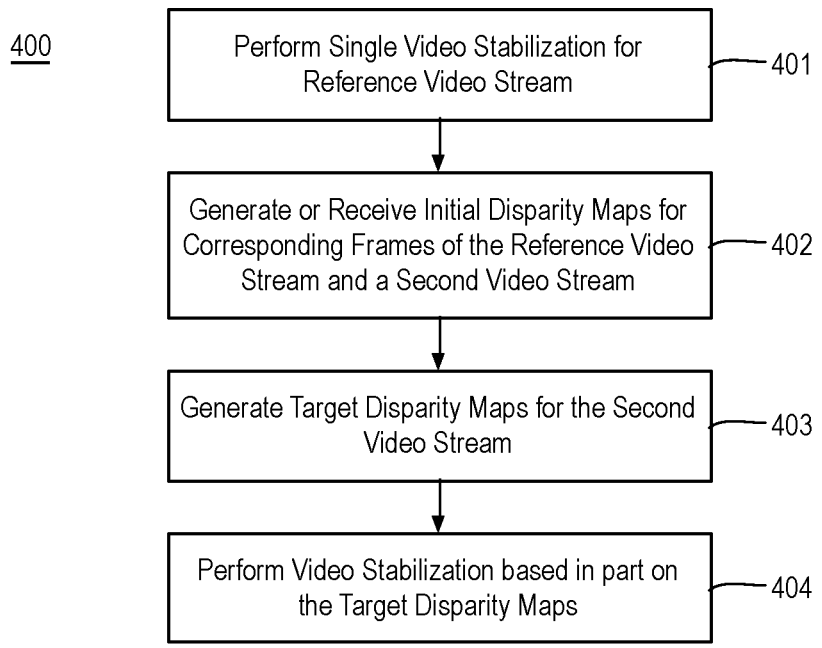
FIG. 4 illustrates an example process for providing multiview video stabilization.

FIG. 4 illustrates an example process 400 for providing multiview video stabilization, arranged in accordance with at least some implementations of the present disclosure. Process 400 may include one or more operations 401-404 as illustrated in FIG. 4. Process 400 or portions thereof may be performed by a device (e.g., device 200 or any other device or system discussed herein) to stabilize multiview video. Process 400 or portions thereof may be repeated for any number views of multiview video, segments of multiview video, or the like.

As shown, process 400 may begin at operation 401, where single view video stabilization may be performed for a reference video stream to generate a stabilized reference video stream. Single view video stabilization may be performed using any suitable technique or techniques such as a 2D stabilization technique, a subspace stabilization technique, or the like. For example, reference video stream 211 may be stabilized using single view video stabilization techniques to generate stabilized reference video stream 217. Furthermore, such single view video stabilization may provide a stabilization transform mapping, warping, or the like such as a transform mapping or warping for feature points of the reference video stream. For example, the single view video stabilization may provide a stabilization transform/warp signal 216.

Processing may continue at operation 402, where initial disparity maps for corresponding frames of the reference video stream and a second video stream (e.g., the video stream to which stabilization is being propagated) may be generated or received. Such initial disparity maps may be generated using any suitable technique or techniques such as stereo matching techniques, optical flow techniques, or the like. For example, initial disparity maps 214 for corresponding frames of reference video stream 211 and video stream 212 and/or initial disparity maps 215 for corresponding frames of reference video stream 211 and video stream 213 may be generated or received.

Processing may continue at operation 403, where target disparity maps may be generated for the second video stream. For example, the target disparity map between synchronized frames of the reference video stream and a second video stream may be generated by applying a stabilization transform corresponding to the single view video stabilization performed for the reference video stream at operation 401 and by minimizing a vertical component (if the reference video stream and second video stream are horizontally aligned) or a horizontal component (if the reference video stream and second video stream are vertically aligned). For example, stabilization propagation module 204 may generate target disparity maps for the generation of stabilized video stream 218 and/or stabilization propagation module 205 may generate target disparity maps for the generation of stabilized video stream 219.

Processing may continue at operation 404, where video stabilization may be performed for the second video stream based in part on the target disparity maps generated at operation 403. For example, positions of feature points for the second video stream may be determined based in part on an energy term that limits or encourages a reduction in the distance between the positions of feature points in the stabilized second video stream and positions of the corresponding feature points in the stabilized reference video stream as modified by the target disparity map. Once the positions of the feature points in the stabilized second video stream are determined based on such processing, the second video stream may be warped based on the translation of feature points from the second video stream to the feature points in the stabilized second video stream to provide a stabilized second video stream. For example, stabilization propagation module 204 may perform video stabilization on video stream 212 to provide stabilized video stream 218 and/or propagation module 205 may perform video stabilization on video stream 213 to provide stabilized video stream 219.

As discussed herein, process 400 or portions thereof may be performed in series or in parallel for any number of other video streams with respect to the reference video stream.

In the context of a single reference video stream and one or more other video stream that are horizontally aligned, the described techniques may offer a stereo-constraining stabilization propagation technique that reduces or eliminates vertical disparities. For example, as discussed, the target disparity vector in such examples may have a target vertical disparity as determined by warping the initial disparity map based on the warping of the reference video stabilization and a horizontal disparity that is minimized or set to 0 or the like. For example, or stereo and horizontal parallax only displays (HPO), the techniques discussed herein may enforce minimum disparity across all N views of the system.

In the context of multiple video streams, such techniques may be provided between a single reference video stream (e.g., reference video stream 211) and any or all other video streams (e.g., video stream 212, 213, and so on). In such examples, the target disparity vector for each video steam to which video stabilization is being propagated may be set as discussed herein based on the alignment of the reference video stream and the video stream being stabilized. In some examples, such processing may be performed in parallel for example. For example, for full 4D light field displays or the like, vertical disparity may be minimized with respect to the interpupillary axis of a user, regardless of the where the observer stands or rotates within the light field. In such contexts, the techniques discussed herein may minimize horizontal and vertical disparity across the M×N matrix of input images in row-wise and column-wise fashion, respectively.

Furthermore, in the context of multiple video streams, in some embodiments, such techniques may be extended to perform multi-stage processing such that earlier stage processing may be decoupled from later stage processing.

Figure 5:
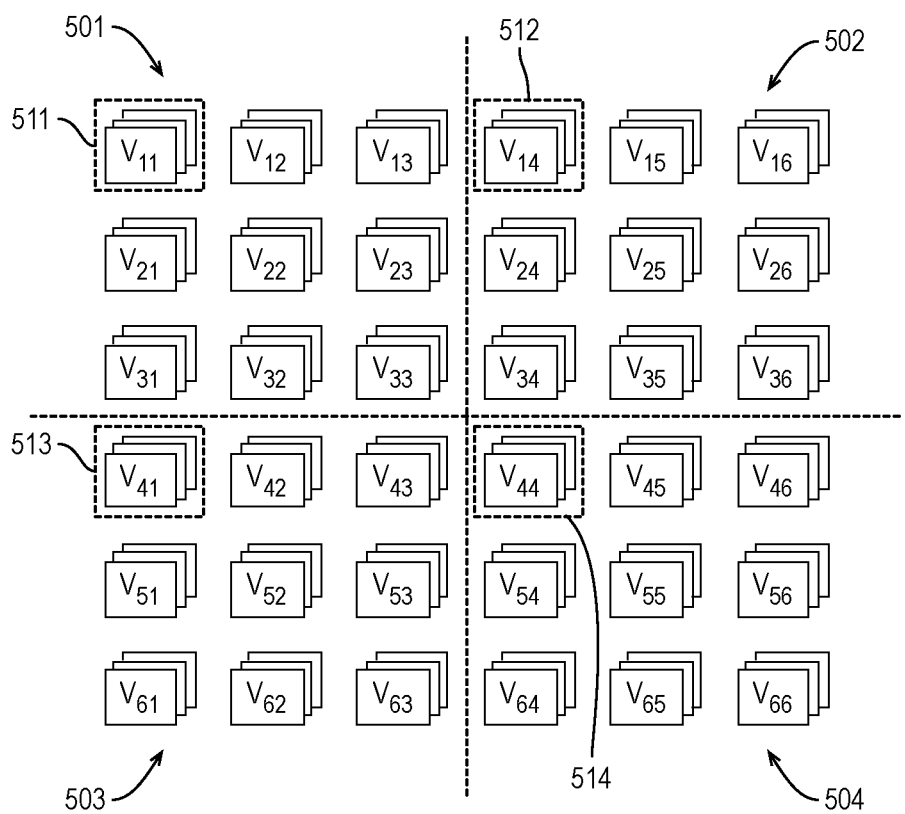
FIG. 5 illustrates example multiview video for providing multi-stage multiview video stabilization.

FIG. 5 illustrates example multiview video 500 for providing multi-stage multiview video stabilization, arranged in accordance with at least some implementations of the present disclosure. As shown in FIG. 5, multiview video 500 may include 36 video streams. Multiview video 500 may be attained by a camera array such as camera array 101, a lightfield camera, or the like. Although illustrated with 36 video streams that are attained in evenly spaced in a 6×6 grid, multiview video 500 may include any number of video streams attained in any suitable orientation. To spread power usage and improve processing speed with respect to propagating image stabilization to each video stream of multiview video 500, the array of video streams of multiview video 500 (e.g., including all 36 video streams $V_{11}$-$V_{66}$) may be divided into sub-arrays 501, 502, 503, 504 and the sub-arrays may be simultaneously or substantially simultaneously stabilized. In the illustrated example, multiview video 500 is divided into four sub-arrays 501, 502, 503, 504 each having the same number (e.g., nine) number of video streams. However, multiview video 500 may be divided into any number of sub-arrays with the sub-arrays having the same or different numbers of video streams.

As shown in FIG. 5, one video stream in each of sub-arrays 501, 502, 503, 504 may be selected as a reference video stream. In the illustrated example, reference video stream 511 (e.g., $V_{11}$) is the reference video stream for sub-array 501, reference video stream 512 (e.g., $V_{14}$) is the reference video stream for sub-array 502, reference video stream 513 (e.g., $V_{41}$) is the reference video stream for sub-array 503, and reference video stream 514 (e.g., $V_{44}$) is the reference video stream for sub-array 504 such that the reference video streams are top-left corner video streams. However, the reference video streams may be in any position (e.g., at another corner or at a center or centrally located) and they may be in different positions in some sub-arrays.

Multi-stage multiview video stabilization may be performed for multiview video 500 as follows. A main or primary reference video stream of the selected reference video streams may be selected. For example, reference video stream 511 may be selected as a main, primary, or overall reference video stream among reference video streams 511, 512, 513, 514. The main or primary reference video stream (e.g., reference video stream 511) may be single view stabilized as discussed herein to provide a reference stabilized video stream. The stabilization of the main or primary reference video stream (e.g., reference video stream 511) may be propagated to the other reference video streams such as reference video streams 512, 513, 514 using the stabilization propagation techniques discussed herein. The stabilization of the reference video streams for each of sub-arrays may then be propagated to other video streams within the sub-arrays. For example, the stabilization of reference video stream 511 may be propagated within sub-array 501, the stabilization of reference video stream 512 may be propagated within sub-array 502, the stabilization of reference video stream 513 may be propagated within sub-array 503, and the stabilization of reference video stream 514 may be propagated within sub-array 504.

Such processing may provide for opportunities for parallel processing as well as decoupling processing such that efficiencies may be provided. Although illustrated with two-levels of stabilization propagation in FIG. 5 (e.g., first propagating from reference video stream 511 to reference video streams 512, 513, 514 and then from such reference video streams to other sub-array streams), any number of levels such as three or more may be used in some contexts to increase processing efficiency.

For example, to stabilize reference video streams 511, 512, 513, 514, techniques as discussed herein for providing stabilization between two video streams may be used. For example, reference video stream 511 may be single view stabilized using any suitable technique or techniques such as those discussed herein. As shown in FIG. 5, reference video streams 511, 512, 513, 514 may be characterized as $V_{11}$, $V_{14}$, $V_{41}$, and $V_{44}$, respectively and their corresponding stabilized reference video streams may be characterized as $\hat{V}_{11}$, $\hat{V}_{14}$, $\hat{V}_{41}$, and $\hat{V}_{44}$, respectively. As discussed, reference video stream 511, $V_{11}$, may be stabilized to a stabilized reference video stream, $\hat{V}_{11}$, based on single view stabilization techniques.

Disparity maps may be determined between reference video streams 511, 512, 513, 514 using any suitable technique or techniques such as stereo matching techniques, optical flow techniques, or the like. In some examples, determining the disparity maps may include preprocessing reference video streams 511, 512, 513, 514. The disparity maps between reference video stream 511, $V_{11}$, and reference video stream 512, $V_{14}$, may be characterized as disparity maps $D_1$ and the disparity maps between reference video stream 511, $V_{11}$, and reference video stream 513, $V_{41}$, may be characterized as disparity maps, $D_4$. Disparity maps between reference video stream 511, $V_{11}$, and reference video stream 514, $V_{44}$, may not be needed.

To determine target disparity maps, the same stabilization transform or warping function applied to reference video stream 511, $V_{11}$, to provide stabilized reference video stream, $\hat{V}_{11}$, may be applied to disparity maps $D_1$ and $D_4$ to provide target disparity maps $\hat{D}_1$ and $\hat{D}_4$, respectively. Furthermore, in generating target disparity maps, $\hat{D}_1$, or in generating target disparity vectors based on target disparity maps, $\hat{D}_1$, a vertical component of the target disparity map may be minimized (e.g., set to zero or a small number or the like). For example, as discussed above, for each feature point pair $(\hat{p}_i^{11}, \hat{p}_i^{14})$ in stabilized video streams $\hat{V}_{11}$ and $\hat{V}_{14}$, such point pairs may be encouraged (e.g., via an energy term or function as described with respect to Equation (1)) to respect a target disparity vector, $\hat{d}_i^1$, such that $\hat{d}_i^1 = [\hat{d}_i^1 \ 0]^T$ where $\hat{d}_i^1$ is the target horizontal disparity and the vertical disparity is set to a minimal value or zero. Based on the feature point positions, $\hat{p}_i^{14}$, determined by application of an energy function as discussed herein or the like, video stream 512, $V_{14}$, may be warped to generate a corresponding stabilized video stream, $\hat{V}_{14}$.

Similarly, for each feature point pair $(\hat{p}_i^{11}, \hat{p}_i^{41})$ in stabilized video streams $\hat{V}_{11}$ and $\hat{V}_{41}$, such point pairs may be encouraged (e.g., via an energy term or function as described with respect to Equation (1)) to respect a target disparity vector, $\hat{d}_i^4$, such that $\hat{d}_i^4 = [0 \ \hat{d}_i^4]^T$ where $\hat{d}_i^4$ is the target vertical disparity and the horizontal disparity is set to a minimal value or zero. Based on the feature point positions, $\hat{p}_i^{41}$, determined by application of an energy function as discussed herein or the like, reference video stream 513, $V_{41}$, may be warped to generate a corresponding stabilized video stream, $\hat{V}_{41}$. Furthermore, to stabilize reference video stream 514, $V_{44}$, which lies in a diagonal direction with respect to reference video stream 511, $V_{11}$, zero horizontal disparity with respect to reference video stream 512, $V_{14}$, and zero vertical disparity with respect to reference video stream 513, $V_{41}$, may be maintained. Therefore, for each feature point pair $(\hat{p}_i^{11}, \hat{p}_i^{44})$ in stabilized video streams $\hat{V}_{11}$ and $\hat{V}_{44}$, such point pairs may be encouraged (e.g., via an energy term or function as described with respect to Equation (1)) to respect a target disparity vector, $\hat{d}_i^{1,4}$, such that $\hat{d}_i^{1,4} = [\hat{d}_i^1 \ \hat{d}_i^4]^T$ where $\hat{d}_i^1$ is the target horizontal disparity and $\hat{d}_i^4$ is the target vertical disparity. Based on the feature point positions, $\hat{p}_i^{44}$, determined by application of an energy function as discussed herein or the like, reference video stream 514, $V_{44}$, may be warped to generate a corresponding stabilized video stream, $\hat{V}_{44}$.

Furthermore, the stabilizations of each of reference video streams 511, 512, 513, 514 may be propagated to the video streams within their respective sub-arrays. For example, the stabilization of reference video stream 511, $V_{11}$, may be propagated to video streams $V_{12}$ and $V_{13}$ using techniques that minimize vertical disparities, to video streams $V_{21}$ and $V_{31}$ using techniques that minimize horizontal disparities, and to video streams $V_{22}$ and $V_{33}$ using techniques that provide diagonal propagation as discussed herein. Similarly, the stabilization of reference video stream 512, 513, and 514 may be propagated within sub-arrays 502, 503, and 504, respectively.

Figure 6:
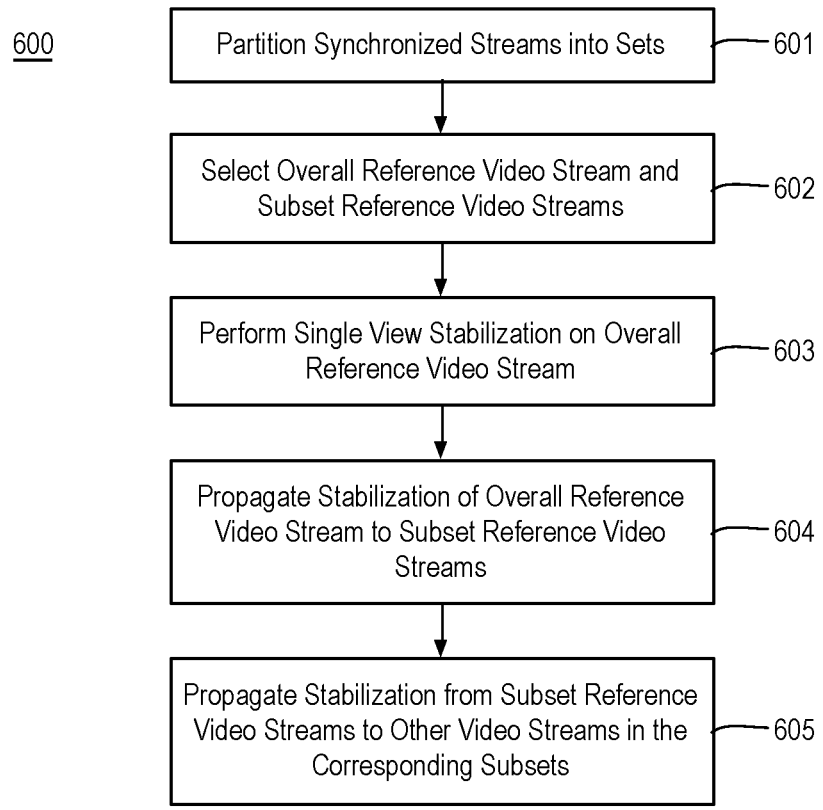
FIG. 6 illustrates an example process for providing multi-stage multiview video stabilization.

FIG. 6 illustrates an example process 600 for providing multi-stage multiview video stabilization, arranged in accordance with at least some implementations of the present disclosure. Process 600 may include one or more operations 601-605 as illustrated in FIG. 6. Process 600 or portions thereof may be performed by a device (e.g., device 200 or any other device or system discussed herein) to stabilize multiview video using multi-stage techniques. Process 600 or portions thereof may be repeated for any number stages and/or views of multiview video, or the like.

As shown, process 600 may begin at operation 601, where synchronized video streams of multiview video may be partitioned. For example, the synchronized video streams of multiview video may be partitioned into sub-arrays such that each sub-array includes one or more video streams. The synchronized video streams of multiview video may be partitioned using any suitable technique or techniques. Such sub-arrays may include the same or different numbers of video streams arranged in any suitable orientation. In an embodiment, multiview video 500 may be partitioned or divided into sub-arrays 501, 502, 503, 504.

Processing may continue at operation 602, where an overall reference video stream of the synchronized video streams of multiview video may be selected. The overall reference video stream may be selected using any suitable technique or techniques. In an embodiment, the overall reference video stream may be a top left corner video stream. In an embodiment, the overall reference video stream may be a center or central video stream. For example, reference video stream 511 may be selected as the overall reference video stream. Furthermore, at operation 602, reference video streams for each of the partitions or sub-arrays may be selected using any suitable technique or techniques.

Processing may continue at operation 603, where single view stabilization may be performed for the overall reference video stream. Such single view stabilization may be performed using any suitable technique or techniques such as those discussed herein. Such single view stabilization may be provide a stabilized overall reference video stream and an associated stabilization transform, warp mapping, warping function, or the like associated with the single view stabilization. For example, the stabilization transform, warp mapping, warping function, or the like may provide a mapping of feature points from the overall reference video stream to the stabilized overall reference video stream.

Processing may continue at operation 604, where the stabilization of the overall reference video stream may be propagated to the subset or sub-array reference video streams. Such propagation may be performed using any suitable technique or techniques discussed herein. For example, propagation may include generating a target disparity map by applying the stabilization transform, warp mapping, warping function, or the like corresponding to the stabilization of the overall reference video stream to an initial disparity map for a frame of the overall reference video and a synchronized frame of the subset or sub-array reference video streams. During the generation of the target disparity map or in applying constraints for the stabilization of the subset or sub-array reference video streams, a vertical component or a horizontal component of the target disparity map may be minimized (e.g., set to zero). For example, if a subset or sub-array reference video stream is horizontal with respect to the overall reference video stream, the vertical component may be minimized and, if a subset or sub-array reference video stream is vertical with respect to the overall reference video stream, the horizontal component may be minimized. Furthermore, if a subset or sub-array reference video stream is diagonal with respect to the overall reference video stream, the target disparity map may include a horizontal component from a warped disparity map between the overall reference video stream and a video stream vertically aligned with the diagonal reference video stream and a vertical component from a warped disparity map between the overall reference video stream and a video stream horizontally aligned with the diagonal reference video stream.

Video stabilization on the subset or sub-array reference video streams may be performed based on the target disparity map and the minimized disparities to generate stabilized subset or sub-array reference video streams. For example, the stabilization may include determining positions of feature points for the stabilized subset or sub-array reference video streams based on corresponding feature points of the stabilized overall reference video stream and the target disparity map and warping the subset or sub-array reference video streams based on the positions of the feature points for the stabilized subset or sub-array reference video streams. For example, the video stabilization of reference video stream 511 may be propagated to reference video streams 512, 513, 514.

Processing may continue at operation 605, where the stabilization from the subset or sub-array reference video streams may be propagated to other video streams in the subsets or sub-arrays corresponding to the subset or sub-array reference video streams. Such stabilization propagation techniques may be performed in the same or similar to the propagation from the overall reference video stream to the subset or sub-array reference video streams. For example, for propagating an individual subset or sub-array reference video stream stabilization to a second video stream within the subset, a target disparity map may be generated by applying the stabilization transform, warp mapping, warping function, or the like corresponding to the stabilization of the subset or sub-array reference video stream to an initial disparity map for a frame of the subset or sub-array reference video and a synchronized frame of the second video stream. During the generation of the target disparity map or in applying constraints for the stabilization of the second video stream, a vertical component or a horizontal component of the target disparity map may be minimized or a diagonal target disparity map may be provided as discussed.

Video stabilization on the second video stream may be performed based on the target disparity map and/or the minimized disparities to generate a stabilized second video streams. For example, the stabilization may include determining positions of feature points for the stabilized second reference video stream based on corresponding feature points of the subset or sub-array video stream and the target disparity map and warping the second video stream based on the positions of the feature points for the stabilized subset or sub-array reference video streams. Such techniques may be applied within each subset or sub-array and such processing may be performed in parallel. For example, stabilization of reference video streams 511, 512, 513, 514 may be propagated to other video streams in sub-arrays 501, 502, 503, 504, respectively.

In some implementations, the discussed techniques may be applied during offline processing. In other implementations, real-time processing may be desirable. In such contexts, it may be desirable to reduce computational complexity while providing high quality multiview video stabilization. For example, adaptive sensing techniques may be applied to reduce computational complexity while providing high quality multiview video stabilization for a user.

Figure 7:
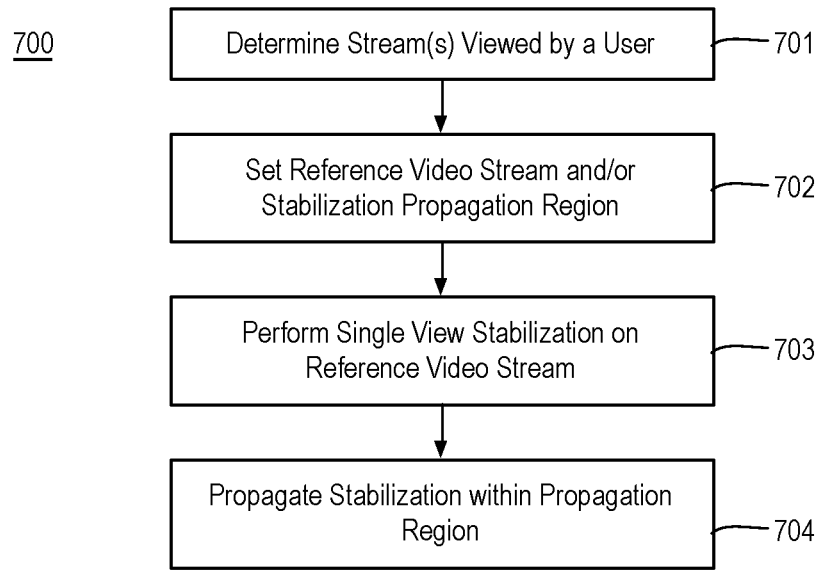
FIG. 7 illustrates an example process for providing user detection and modified multiview video stabilization.

FIG. 7 illustrates an example process 700 for providing user detection and modified multiview video stabilization, arranged in accordance with at least some implementations of the present disclosure. Process 700 may include one or more operations 701-704 as illustrated in FIG. 7. Process 700 or portions thereof may be performed by a device (e.g., device 200 or any other device or system discussed herein) to stabilize multiview video using multi-stage techniques. Process 700 or portions thereof may be repeated for any number of multiview video segments, or the like.

As shown, process 700 may begin at operation 701, where one or more streams being viewed by a user may be determined. For example, in the context of process 700, multiview video may be being presented to a user in real-time via any suitable display such as a flat display, curved display, a light field display, a head mounted display, or the like. The determination as to which view of the multiview video the user is viewing or focused on or the like may be made using any suitable technique or techniques. For example, in the context of a flat, curved, or light field display, head and/or eye positional detection and tracking of the user may be performed. Such positional detection and tracking techniques may include face detection, depth camera tracking, or the like. Furthermore, such techniques may be combined with a Kalman filtering techniques or the like to predict the view the user is observing as the user moves with six degrees of freedom within the display volume. Such positional detection and tracking may provide a very high confidence as to which view the user is currently viewing or focused on of an array of views (e.g., an M×N matrix of views). In the context of a head mounted display or a glasses type display (e.g., near-eye displays), eye gaze detection and tracking may be performed. For example, determining the video stream being viewed may include head tracking, eye tracking, or gaze tracking. For example, with reference to FIG. 5, a user may be viewing or focused on any video stream of multiview video 500. For exemplary purposes, it is assumed the user is viewing or focused on video stream $V_{23}$.

Processing may continue at operation 702, where a reference video stream and/or a stabilization propagation region may be set based on the stream or streams being viewed by the user as determined at operation 701. In an embodiment, the reference video stream (e.g., for single view stabilization) may be set as the stream being viewed by the user. If multiple streams are determined at operation 701, a center stream or a default side (e.g., left or right side) may be set as the reference video stream. Furthermore, a stabilization propagation region may be set at operation 702. For example, the stabilization propagation region may include a region of views around or adjacent to the selected reference video stream. For example, the stabilization propagation region may be include a 3×3 set of video streams with the reference video stream at the center. For example, continuing the above example and with reference to FIG. 5, if a user is viewing or focused video stream $V_{23}$, the reference video stream may be $V_{23}$ and the stabilization propagation region may include video streams $V_{12}$, $V_{13}$, $V_{14}$, $V_{22}$, $V_{23}$, $V_{24}$, $V_{32}$, $V_{33}$, and $V_{34}$.

Processing may continue at operation 703, where single view stabilization may be performed on the reference video stream selected at operation 702. Such single view stabilization may be performed using any suitable technique or techniques such as those discussed herein.

Processing may continue at operation 704, where the single view stabilization performed at operation 703 may be propagated to other video streams within the propagation regions. Such single view stabilization may be propagated using any suitable technique or techniques discussed herein. As discussed, by such reference view selection and setting of a limited propagation region may provide for reduce computational complexity such that the stabilization may be performed in real time for a user. In the example of FIG. 5, a 36 view array may be reduced to 9 views. In other examples, the savings may be even more dramatic. For example, in a 20×20 view system the reduction from stabilizing 400 views to stabilizing 9 or 16 views or the like may provide significant savings. Furthermore, such techniques may provide stabilization in the area the user is viewing. In some examples, if processing resources and/or time allow, the initial propagation region may be expanded.

Figure 8:
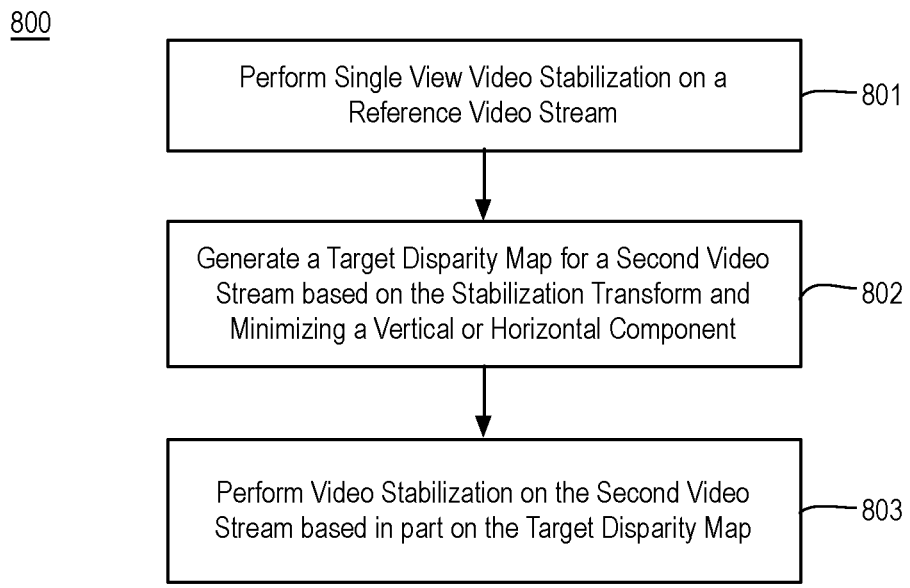
FIG. 8 is a flow diagram illustrating an example process for providing multiview video stabilization.

FIG. 8 is a flow diagram illustrating an example process 800 for providing multiview video stabilization, arranged in accordance with at least some implementations of the present disclosure. Process 800 may include one or more operations 801-803 as illustrated in FIG. 8. Process 800 may form at least part of a multiview video stabilization technique. By way of non-limiting example, process 800 may form at least part of a multiview video stabilization technique performed by device 200 as discussed herein. Furthermore, process 800 will be described herein with reference to system 900 of FIG. 9.

Figure 9:
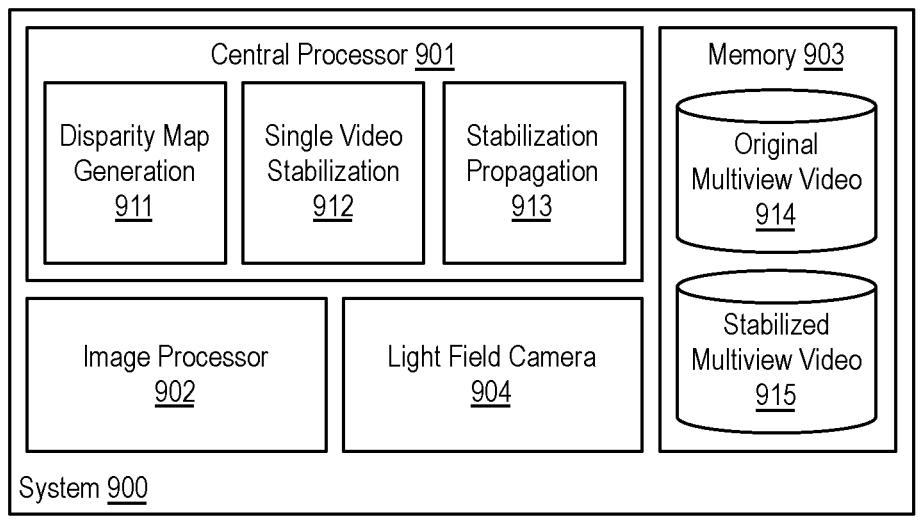
FIG. 9 is an illustrative diagram of an example system for providing multiview video stabilization.

FIG. 9 is an illustrative diagram of an example system 900 for providing multiview video stabilization, arranged in accordance with at least some implementations of the present disclosure. As shown in FIG. 9, system 900 may include a central processor 901, an image processor 902, a memory 903, and a light field camera 904. Also as shown, central processor 901 may include or implement a disparity map generation module 911, a single video stabilization module 912, and a stabilization propagation module 913. Furthermore, memory 903 may include or implement an original multiview video 914 and a stabilized multiview video 915.

Such components or modules may be implemented to perform operations as discussed herein. For example, disparity map generation module 911 may generate disparity maps as discussed herein (e.g., perform operations discussed with respect to and/or embody disparity modules 201, 202, or the like). Single video stabilization module 912 may provide single video stabilization as discussed herein (e.g., perform operations discussed with respect to and/or embody single video stabilization module 203 or the like). Stabilization propagation module 913 may propagate video stabilization to one or more other video sequences as discussed herein (e.g., perform operations discussed with respect to and/or embody stabilization propagation modules 204, 205, or the like). In the example of system 900, memory 903 may include original multiview video 914 and stabilized multiview video 915, which may be data structures representing input multiview video 210 and stabilized multiview video 220, respectively. Memory 903 may also store disparity maps, disparity vectors, video frames, feature points, stabilization transforms, warping maps, sub-array or subsection selections, user tracking data, or any other data discussed herein.

As shown, in some examples, disparity map generation module 911, single video stabilization module 912, and stabilization propagation module 913 may be implemented via central processor 901. In other examples, one or more or portions of disparity map generation module 911, single video stabilization module 912, and stabilization propagation module 913 may be implemented via image processor 901, a video processor, a graphics processor, or the like. In yet other examples, one or more or portions of disparity map generation module 911, single video stabilization module 912, and stabilization propagation module 913 may be implemented via an image or video processing pipeline or unit.

Image processor 902 may include any number and type of graphics, image, or video processing units that may provide the operations as discussed herein. In some examples, image processor 902 may be an image signal processor. Such operations may be implemented via software or hardware or a combination thereof. For example, image processor 902 may include circuitry dedicated to manipulate frame data, image data, or video data obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, one or more or portions of disparity map generation module 911, single video stabilization module 912, and stabilization propagation module 913 may be implemented via an execution unit (EU) of image processor 902. The EU may include, for example, programmable logic or circuitry such as a logic core or cores that may provide a wide array of programmable logic functions. In an embodiment, one or more or portions of disparity map generation module 911, single video stabilization module 912, and stabilization propagation module 913 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of disparity map generation module 911, single video stabilization module 912, and stabilization propagation module 913 may be implemented via an application specific integrated circuit (ASIC). The ASIC may include an integrated circuitry customized to perform the operations discussed herein.

Light field camera 904 may include any suitable light field camera having any suitable number of micro-lenses or the like for capturing multiview video. Such cameras may be also be characterized as plenoptic cameras. In other embodiments, light field camera 904 may not be implemented or light field camera 904 may be replaced by a camera array or the like.

Returning to discussion of FIG. 8, process 800 may begin at operation 801, where single view video stabilization may be performed on a reference video stream to generate a stabilized reference video stream. The single view video stabilization may be performed using any suitable technique or techniques. For example, single view stabilization module 912 as implemented via central processor 901 may perform the single view video stabilization. As is discussed below, operations 802, 803 may propagate the single view video stabilization to a second video stream.

Processing may continue at operation 802, where a target disparity map may be generated by applying a stabilization transform corresponding to the single video stabilization to an initial disparity map for a frame of the reference video and a synchronized frame of the second video stream and by minimizing at least a vertical component or a horizontal component of the target disparity map. For example, the initial disparity map may be generated by disparity map generation module 911 as implemented via central processor 901. Furthermore the target disparity map may be generated by stabilization propagation module 913 as implemented via central processor 901. In an embodiment, minimizing the vertical or horizontal component may include setting the vertical or horizontal component for each position of the target disparity map to zero. For example, the vertical component may be set to zero when the reference video stream and the second video stream are horizontally aligned and the horizontal component may be set to zero when the reference video stream and the second video stream are vertically aligned.

Processing may continue at operation 803, where video stabilization on the second video stream may be performed based at least in part on the target disparity map to generate a stabilized second video stream. For example, stabilization propagation module 913 as implemented via central processor 901 may perform the video stabilization on the second video stream. In an embodiment, performing video stabilization on the second video stream may include determining positions of feature points for a stabilized frame of the second video stream based on corresponding feature points of a corresponding frame of the stabilized reference video stream and the target disparity map and warping the synchronized frame of the second video stream based on the positions of the feature points for the stabilized frame of the second video stream.

Operations 802, 803 may be repeated any number of times to propagate the single view video stabilization to other video streams. In an embodiment, the single view video stabilization may be propagated to a third video stream by generating a second target disparity map by applying the stabilization transform corresponding to the single video stabilization to a second initial disparity map for the frame of the reference video and a synchronized second frame of the third video stream and by minimizing a vertical component the second target disparity map and performing video stabilization on the third video stream based at least in part on the second target disparity map to generate a stabilized third video stream. For example, the horizontal component may be minimized in the target disparity map.

In another embodiment, the single view video stabilization may be propagated to a third video stream diagonal with respect to the reference video stream by generating a second target disparity map by applying the stabilization transform corresponding to the single video stabilization to a second initial disparity map for the frame of the reference video and a synchronized frame of a fourth video stream and by setting a vertical component of the second target disparity map based on the stabilization transformed second disparity map and a horizontal component of the second target disparity map based on the stabilization transformed disparity map such that the second video stream is horizontally aligned with the reference video stream, the fourth video stream is vertically aligned with the reference video stream, and the third video stream, as discussed, is diagonally aligned with the reference video stream and performing video stabilization on the third video stream based at least in part on the second target disparity map to generate a stabilized third video stream.

Furthermore, in some embodiments, operations 802, 803 may be repeated with one or more video streams stabilized at operation 803 as a reference video frame. Such processing may provide multi-stage multiview stabilization propagation. In an embodiment, multiple synchronized streams of multiview video (e.g., a set) may be partitioned into subsets of synchronized streams of multiview video such that the reference video stream is in a first subset and the second video stream is in a second subset and the single view video stabilization may be propagated to a third video stream in a third subset (based on the implementation of operations 802, 803 for the third video stream). For example, propagating the single view video stabilization to the second video stream and the third video stream is performed at least partially in parallel.

The stabilization of the reference video streams in each subset may be propagated to other video streams in the respective subsets. For example, video stabilization from the second video stream may be propagated to one or more other video streams in the second subset and video stabilization from the third video stream may be propagated to one or more other video streams in the third subset (based on the implementation of operations 802, 803 for the third video stream). For example, such propagations may be performed the at least partially in parallel.

In some embodiments, adaptive sensing techniques or the like may be applied reduce the number of video streams being stabilized. In an embodiment, one or more viewed video streams associated with a viewer of the multiview video may be determined and the reference video stream may be set based at least in part on the one or more viewed video streams associated with the viewer. For example, central processor 901 and/or image processor 902 may determine the one or more viewed video streams and set the reference video stream based on the one or more viewed video streams. In an embodiment, determining the one or more viewed video streams associated with the viewer may include head tracking, eye tracking, gaze tracking, or the like.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multifunction device or a computing system such as, for example, a laptop computer, a tablet, or a smart phone. Those skilled in the art may recognize that systems described herein may include additional components that have not been depicted in the corresponding figures. For example, the systems discussed herein may include additional components such as image pre-processing circuitry, memory controllers, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any operation discussed herein or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
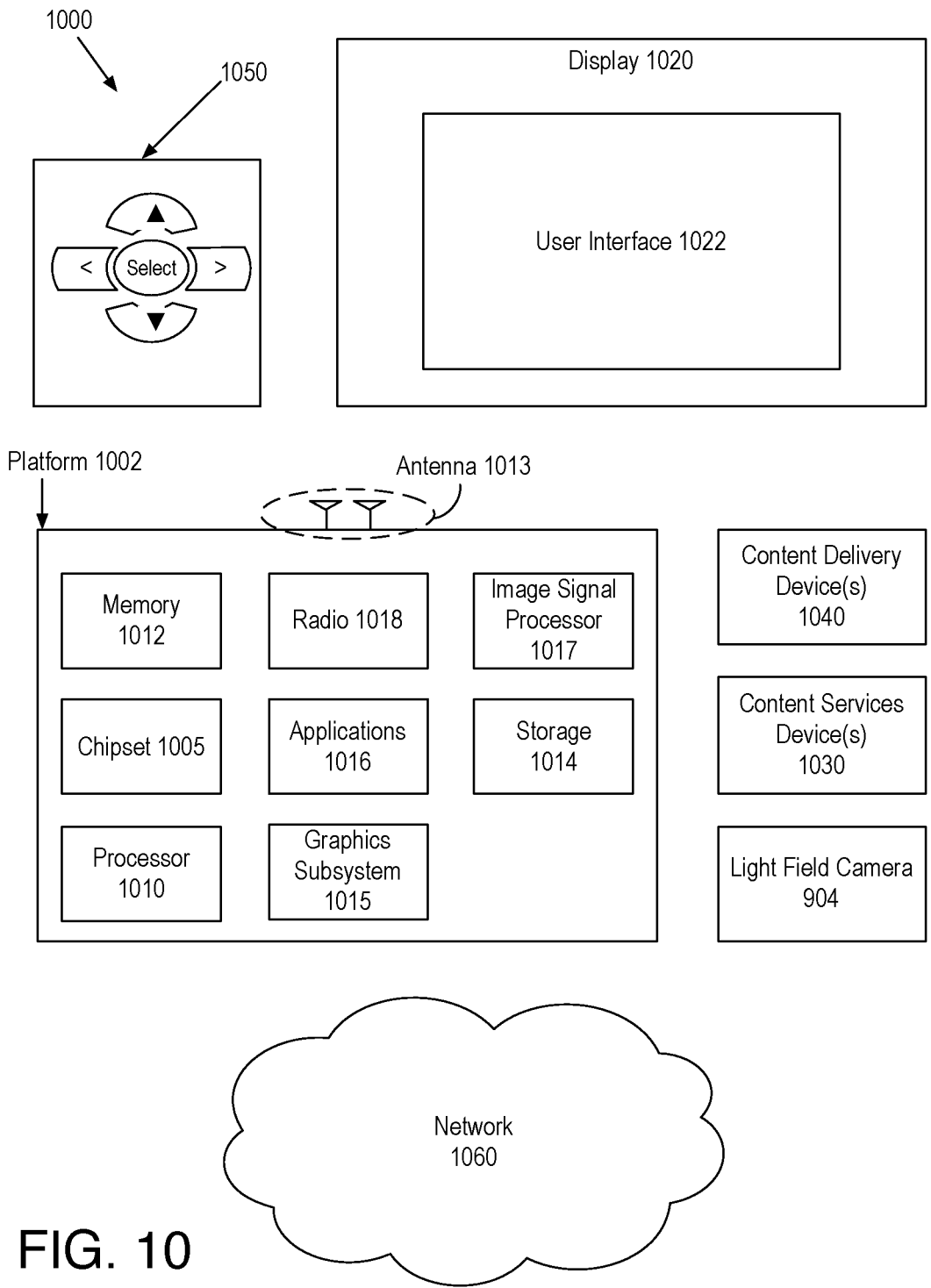
FIG. 10 is an illustrative diagram of an example system.

FIG. 10 is an illustrative diagram of an example system 1000, arranged in accordance with at least some implementations of the present disclosure. In various implementations, system 1000 may be a computing system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile internet device (MID), messaging device, data communication device, peripheral device, scanner, printer, multi-function device, and so forth.

In various implementations, system 1000 includes a platform 1002 coupled to a display 1020. Platform 1002 may receive content from a content device such as content services device(s) 1030 or content delivery device(s) 1040 or other content sources such as light field camera 904 or a camera array. For example, platform 1002 may receive raw image or video data from light field camera 904 or any other content source. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016, image signal processor 1017 and/or radio 1018. Chipset 1005 may provide intercommunication among processor 1010, memory 1012, storage 1014, graphics subsystem 1015, applications 1016, image signal processor 1017 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU), a visual processing unit (VPU), or an image processing unit, for example. In some examples, graphics subsystem 1015 may perform scanned image rendering as discussed herein. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any flat panel monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way. Light field camera 904 may include any light field camera, plenoptic camera, or camera array that may provide multiview video.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, video conference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
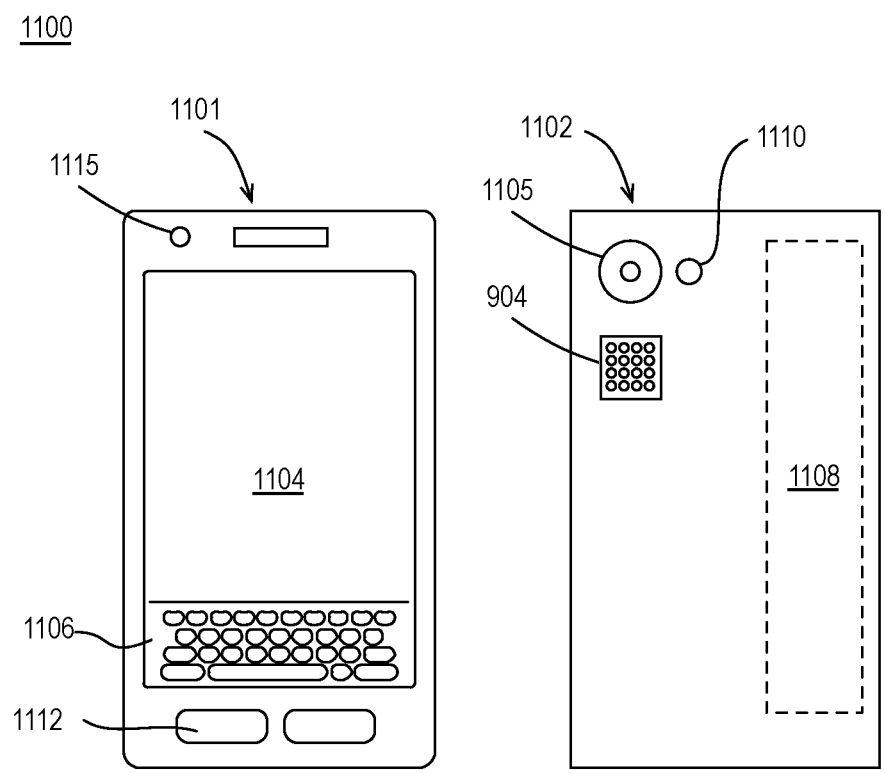
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other devices or systems, or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100 and a camera 1115 integrated into front 1101 of device 1100. Camera 1105 and flash 1110 and/or camera 1115 may be components of a camera module to originate image data processed into streaming video that is output to display 1104 and/or communicated remotely from device 1100 via antenna 1108 for example. Furthermore, device 1100 may include light field camera 904, which may include any suitable camera for providing multiview video as discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for providing multiview video stabilization comprises performing single view video stabilization on a reference video stream to generate a stabilized reference video stream and propagating the single view video stabilization to a second video stream by generating a target disparity map by applying a stabilization transform corresponding to the single video stabilization to an initial disparity map for a frame of the reference video and a synchronized frame of the second video stream and by minimizing at least a vertical component or a horizontal component of the target disparity map and performing video stabilization on the second video stream based at least in part on the target disparity map to generate a stabilized second video stream.

Further to the first embodiments, minimizing the vertical or horizontal component comprises setting the vertical or horizontal component for each position of the target disparity map to zero.

Further to the first embodiments, minimizing the vertical or horizontal component comprises setting the vertical or horizontal component for each position of the target disparity map to zero and the vertical component is set to zero when the reference video stream and the second video stream are horizontally aligned and the horizontal component is set to zero when the reference video stream and the second video stream are vertically aligned.

Further to the first embodiments, performing video stabilization on the second video stream comprises determining positions of feature points for a stabilized frame of the second video stream based on corresponding feature points of a corresponding frame of the stabilized reference video stream and the target disparity map and warping the synchronized frame of the second video stream based on the positions of the feature points for the stabilized frame of the second video stream.

Further to the first embodiments, the method further comprises partitioning a plurality of synchronized streams of multiview video into a plurality of subsets of synchronized streams of multiview video, wherein the reference video stream is in a first subset and the second video stream is in a second subset and propagating the single view video stabilization to a third video stream in a third subset of the plurality of subsets of synchronized streams.

Further to the first embodiments, the method further comprises partitioning a plurality of synchronized streams of multiview video into a plurality of subsets of synchronized streams of multiview video, wherein the reference video stream is in a first subset and the second video stream is in a second subset and propagating the single view video stabilization to a third video stream in a third subset of the plurality of subsets of synchronized streams, and propagating the single view video stabilization to the second video stream and the third video stream is performed at least partially in parallel.

Further to the first embodiments, the method further comprises propagating video stabilization from the second video stream to one or more other video streams in the second subset and propagating video stabilization from the third video stream to one or more other video streams in the third subset at least partially in parallel to the propagation of the video stabilization from the second video stream to the one or more other video streams in the second subset.

Further to the first embodiments, the method further comprises propagating the single view video stabilization to a third video stream by generating a second target disparity map by applying the stabilization transform corresponding to the single video stabilization to a second initial disparity map for the frame of the reference video and a synchronized second frame of the third video stream and by minimizing a vertical component the second target disparity map, wherein the horizontal component is minimized in the target disparity map and performing video stabilization on the third video stream based at least in part on the second target disparity map to generate a stabilized third video stream.

Further to the first embodiments, the method further comprises propagating the single view video stabilization to a third video stream by generating a second target disparity map by applying the stabilization transform corresponding to the single video stabilization to a second initial disparity map for the frame of the reference video and a synchronized frame of a fourth video stream and by setting a vertical component of the second target disparity map based on the stabilization transformed second disparity map and a horizontal component of the second target disparity map based on the stabilization transformed disparity map, wherein the second video stream is horizontally aligned with the reference video stream, the fourth video stream is vertically aligned with the reference video stream, and the third video stream is diagonally aligned with the reference video stream and performing video stabilization on the third video stream based at least in part on the second target disparity map to generate a stabilized third video stream.

Further to the first embodiments, the method further comprises determining one or more viewed video streams associated with a viewer of the multiview video and setting the reference video stream based at least in part on the one or more viewed video streams associated with the viewer.

Further to the first embodiments, the method further comprises determining one or more viewed video streams associated with a viewer of the multiview video and setting the reference video stream based at least in part on the one or more viewed video streams associated with the viewer, and determining the one or more viewed video streams associated with the viewer comprises at least one of head tracking, eye tracking, or gaze tracking, and the reference video stream is one of the one or more viewed video streams.

In one or more second embodiments, a system for providing multiview video stabilization comprises a memory configured to store a reference video stream and a second video stream and a processor coupled to the memory, the processor to perform single view video stabilization on a reference video stream to generate a stabilized reference video stream and to propagate the single view video stabilization to a second video stream, wherein the processor to propagate the single view video stabilization comprises the processor to generate a target disparity map based on application of a stabilization transform corresponding to the single video stabilization to an initial disparity map for a frame of the reference video and a synchronized frame of the second video stream and minimization of at least a vertical component or a horizontal component of the target disparity map and to perform video stabilization on the second video stream based at least in part on the target disparity map to generate a stabilized second video stream.

Further to the second embodiments, the minimization of the vertical or horizontal component comprises the processor to set the vertical or horizontal component for each position of the target disparity map to zero.

Further to the second embodiments, the minimization of the vertical or horizontal component comprises the processor to set the vertical or horizontal component for each position of the target disparity map to zero and the vertical component is set to zero when the reference video stream and the second video stream are horizontally aligned and the horizontal component is set to zero when the reference video stream and the second video stream are vertically aligned.

Further to the second embodiments, the processor to perform video stabilization on the second video stream comprises the processor to determine positions of feature points for a stabilized frame of the second video stream based on corresponding feature points of a corresponding frame of the stabilized reference video stream and the target disparity map and to warp the synchronized frame of the second video stream based on the positions of the feature points for the stabilized frame of the second video stream.

Further to the second embodiments, the processor is further to partition a plurality of synchronized streams of multiview video into a plurality of subsets of synchronized streams of multiview video, wherein the reference video stream is in a first subset and the second video stream is in a second subset, and to propagate the single view video stabilization to a third video stream in a third subset of the plurality of subsets of synchronized streams.

Further to the second embodiments, the processor is further to partition a plurality of synchronized streams of multiview video into a plurality of subsets of synchronized streams of multiview video, wherein the reference video stream is in a first subset and the second video stream is in a second subset, and to propagate the single view video stabilization to a third video stream in a third subset of the plurality of subsets of synchronized streams and the processor to propagate the single view video stabilization to the second video stream and the third video stream is performed at least partially in parallel.

Further to the second embodiments, the processor is further to partition a plurality of synchronized streams of multiview video into a plurality of subsets of synchronized streams of multiview video, wherein the reference video stream is in a first subset and the second video stream is in a second subset, and to propagate the single view video stabilization to a third video stream in a third subset of the plurality of subsets of synchronized streams and the processor is further to propagate video stabilization from the second video stream to one or more other video streams in the second subset and propagate video stabilization from the third video stream to one or more other video streams in the third subset at least partially in parallel to the propagation of the video stabilization from the second video stream to the one or more other video streams in the second subset.

Further to the second embodiments, the processor is further to partition a plurality of synchronized streams of multiview video into a plurality of subsets of synchronized streams of multiview video, wherein the reference video stream is in a first subset and the second video stream is in a second subset, and to propagate the single view video stabilization to a third video stream in a third subset of the plurality of subsets of synchronized streams, and/or to propagate video stabilization from the second video stream to one or more other video streams in the second subset and propagate video stabilization from the third video stream to one or more other video streams in the third subset at least partially in parallel to the propagation of the video stabilization from the second video stream to the one or more other video streams in the second subset.

Further to the second embodiments, the processor is further to propagate the single view video stabilization to a third video stream, wherein the processor propagate the single view video stabilization to the third video stream comprises the processor to generate a second target disparity map based on application of the stabilization transform corresponding to the single video stabilization to a second initial disparity map for the frame of the reference video and a synchronized second frame of the third video stream and by minimizing a vertical component the second target disparity map, wherein the horizontal component is minimized in the target disparity map and to perform video stabilization on the third video stream based at least in part on the second target disparity map to generate a stabilized third video stream.

Further to the second embodiments, the processor is further to propagate the single view video stabilization to a third video stream, wherein the processor to propagate the single view video stabilization to the third video stream comprises the processor to generate a second target disparity map based on application of the stabilization transform corresponding to the single video stabilization to a second initial disparity map for the frame of the reference video and a synchronized frame of a fourth video stream and the processor to set a vertical component of the second target disparity map based on the stabilization transformed second disparity map and a horizontal component of the second target disparity map based on the stabilization transformed disparity map, wherein the second video stream is horizontally aligned with the reference video stream, the fourth video stream is vertically aligned with the reference video stream, and the third video stream is diagonally aligned with the reference video stream, and to perform video stabilization on the third video stream based at least in part on the second target disparity map to generate a stabilized third video stream.

Further to the second embodiments, the processor is further to determine one or more viewed video streams associated with a viewer of the multiview video and to set the reference video stream based at least in part on the one or more viewed video streams associated with the viewer.

Further to the second embodiments, the processor is further to determine one or more viewed video streams associated with a viewer of the multiview video and to set the reference video stream based at least in part on the one or more viewed video streams associated with the viewer and the processor to determine the one or more viewed video streams associated with the viewer comprises the processor to perform at least one of head tracking, eye tracking, or gaze tracking, and the reference video stream is one of the one or more viewed video streams.

In one or more third embodiments, a system comprises means for performing single view video stabilization on a reference video stream to generate a stabilized reference video stream and means for propagating the single view video stabilization to a second video stream comprising means for generating a target disparity map by applying a stabilization transform corresponding to the single video stabilization to an initial disparity map for a frame of the reference video and a synchronized frame of the second video stream and by minimizing at least a vertical component or a horizontal component of the target disparity map and means for performing video stabilization on the second video stream based at least in part on the target disparity map to generate a stabilized second video stream.

Further to the third embodiments, minimizing the vertical or horizontal component comprises setting the vertical or horizontal component for each position of the target disparity map to zero, and wherein the vertical component is set to zero when the reference video stream and the second video stream are horizontally aligned and the horizontal component is set to zero when the reference video stream and the second video stream are vertically aligned.

Further to the third embodiments, the means for performing video stabilization on the second video stream comprise means for determining positions of feature points for a stabilized frame of the second video stream based on corresponding feature points of a corresponding frame of the stabilized reference video stream and the target disparity map and means for warping the synchronized frame of the second video stream based on the positions of the feature points for the stabilized frame of the second video stream.

Further to the third embodiments, the system further comprises means for partitioning a plurality of synchronized streams of multiview video into a plurality of subsets of synchronized streams of multiview video, wherein the reference video stream is in a first subset and the second video stream is in a second subset and means for propagating the single view video stabilization to a third video stream in a third subset of the plurality of subsets of synchronized streams.

Further to the third embodiments, the system further comprises means for propagating the single view video stabilization to a third video stream comprising means for generating a second target disparity map by applying the stabilization transform corresponding to the single video stabilization to a second initial disparity map for the frame of the reference video and a synchronized frame of a fourth video stream and by setting a vertical component of the second target disparity map based on the stabilization transformed second disparity map and a horizontal component of the second target disparity map based on the stabilization transformed disparity map, wherein the second video stream is horizontally aligned with the reference video stream, the fourth video stream is vertically aligned with the reference video stream, and the third video stream is diagonally aligned with the reference video stream and means for performing video stabilization on the third video stream based at least in part on the second target disparity map to generate a stabilized third video stream.

Further to the third embodiments, the system further comprises means for determining one or more viewed video streams associated with a viewer of the multiview video and means for setting the reference video stream based at least in part on the one or more viewed video streams associated with the viewer.

In one or more fourth embodiments, at least one machine readable medium comprises a plurality of instructions that, in response to being executed on a device, cause the device to provide multiview video stabilization by performing single view video stabilization on a reference video stream to generate a stabilized reference video stream and propagating the single view video stabilization to a second video stream by generating a target disparity map by applying a stabilization transform corresponding to the single video stabilization to an initial disparity map for a frame of the reference video and a synchronized frame of the second video stream and by minimizing at least a vertical component or a horizontal component of the target disparity map and performing video stabilization on the second video stream based at least in part on the target disparity map to generate a stabilized second video stream.

Further to the fourth embodiments, minimizing the vertical or horizontal component comprises setting the vertical or horizontal component for each position of the target disparity map to zero and the vertical component is set to zero when the reference video stream and the second video stream are horizontally aligned and the horizontal component is set to zero when the reference video stream and the second video stream are vertically aligned.

Further to the fourth embodiments, performing video stabilization on the second video stream comprises determining positions of feature points for a stabilized frame of the second video stream based on corresponding feature points of a corresponding frame of the stabilized reference video stream and the target disparity map and warping the synchronized frame of the second video stream based on the positions of the feature points for the stabilized frame of the second video stream.

Further to the fourth embodiments, the machine readable medium further comprises a plurality of instructions that, in response to being executed on the device, cause the device to provide multiview video stabilization by partitioning a plurality of synchronized streams of multiview video into a plurality of subsets of synchronized streams of multiview video, wherein the reference video stream is in a first subset and the second video stream is in a second subset and propagating the single view video stabilization to a third video stream in a third subset of the plurality of subsets of synchronized streams.

Further to the fourth embodiments, the machine readable medium further comprises a plurality of instructions that, in response to being executed on the device, cause the device to provide multiview video stabilization by partitioning a plurality of synchronized streams of multiview video into a plurality of subsets of synchronized streams of multiview video, wherein the reference video stream is in a first subset and the second video stream is in a second subset and propagating the single view video stabilization to a third video stream in a third subset of the plurality of subsets of synchronized streams, and propagating video stabilization from the second video stream to one or more other video streams in the second subset and propagating video stabilization from the third video stream to one or more other video streams in the third subset at least partially in parallel to the propagation of the video stabilization from the second video stream to the one or more other video streams in the second subset.

Further to the fourth embodiments, the machine readable medium further comprises a plurality of instructions that, in response to being executed on the device, cause the device to provide multiview video stabilization by propagating the single view video stabilization to a third video stream by generating a second target disparity map by applying the stabilization transform corresponding to the single video stabilization to a second initial disparity map for the frame of the reference video and a synchronized frame of a fourth video stream and by setting a vertical component of the second target disparity map based on the stabilization transformed second disparity map and a horizontal component of the second target disparity map based on the stabilization transformed disparity map, wherein the second video stream is horizontally aligned with the reference video stream, the fourth video stream is vertically aligned with the reference video stream, and the third video stream is diagonally aligned with the reference video stream and performing video stabilization on the third video stream based at least in part on the second target disparity map to generate a stabilized third video stream.

Further to the fourth embodiments, the machine readable medium further comprises a plurality of instructions that, in response to being executed on the device, cause the device to provide multiview video stabilization by determining one or more viewed video streams associated with a viewer of the multiview video and setting the reference video stream based at least in part on the one or more viewed video streams associated with the viewer.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method for providing multi-view video stabilization comprising:
attaining input multiview video comprising a plurality of synchronized input video streams from a corresponding plurality of cameras;
selecting a reference view of the synchronized input video streams, wherein the reference view corresponds to an observed view of a viewer;
performing single view video stabilization, to compensate for video jitter, on a reference video stream, corresponding to the reference view, of the plurality of synchronized input video streams to generate a stabilized reference video stream, wherein performing the single view video stabilization comprises applying a stabilization transform to a frame of the reference video stream to generate a stabilized frame of the stabilized reference video stream;
detecting a plurality of locations of stabilized feature points from the stabilized frame;
propagating the single view video stabilization to a second video stream of the plurality of synchronized input video streams by:
generating a target disparity map by applying the stabilization transform to an initial disparity map for the frame of the reference video stream and a synchronized frame of the second video stream and by minimizing at least a vertical component or a horizontal component of the target disparity map, the target disparity map comprising a plurality of disparity vectors;
determining locations for synchronized stabilized feature points of a synchronized stabilized frame of the second video stream corresponding to the stabilized frame by determining the locations for the synchronized stabilized feature points that minimize an energy term comprising a plurality of differences between the locations of the synchronized stabilized feature points and sums of corresponding locations of the stabilized feature points of the stabilized frames and corresponding disparity vectors of the target disparity map; and
performing video stabilization on the second video stream by warping the synchronized frame using the synchronized stabilized feature points to generate a synchronized stabilized frame of a stabilized second video stream; and
presenting stabilized multiview video comprising at least the stabilized second video stream to the viewer.

2. The method of claim 1, wherein minimizing the vertical or horizontal component comprises setting the vertical or horizontal component for each position of the target disparity map to zero.

3. The method of claim 2, wherein the vertical component is set to zero when the reference video stream and the second video stream are horizontally aligned and the horizontal component is set to zero when the reference video stream and the second video stream are vertically aligned.

4. The method of claim 1, further comprising: partitioning the plurality of synchronized input video streams into a plurality of subsets of synchronized streams of multiview video, wherein the reference video stream is in a first subset and the second video stream is in a second subset; and propagating the single view video stabilization to a third video stream in a third subset of the plurality of subsets of synchronized streams.

5. The method of claim 4, wherein propagating the single view video stabilization to the second video stream and the third video stream is performed at least partially in parallel.

6. The method of claim 4, further comprising: propagating video stabilization from the second video stream to one or more other video streams in the second subset; and propagating video stabilization from the third video stream to one or more other video streams in the third subset at least partially in parallel to the propagation of the video stabilization from the second video stream to the one or more other video streams in the second subset.

7. The method of claim 1, further comprising: propagating the single view video stabilization to a third video stream by: generating a second target disparity map by applying the stabilization transform to a second initial disparity map for the frame of the reference video and a synchronized second frame of the third video stream and by minimizing a vertical component of the second target disparity map, wherein the horizontal component is minimized in the target disparity map; and performing video stabilization on the third video stream based at least in part on the second target disparity map to generate a stabilized third video stream.

8. The method of claim 1, further comprising: propagating the single view video stabilization to a third video stream by: generating a second target disparity map by applying the stabilization transform to a second initial disparity map for the frame of the reference video and a synchronized frame of a fourth video stream and by setting a vertical component of the second target disparity map based on the stabilization transformed second disparity map and a horizontal component of the second target disparity map based on the stabilization transformed disparity map, wherein the s econd video stream is horizontally aligned with the reference video stream, the fourth video stream is vertically aligned with the reference video stream, and the third video stream is diagonally aligned with the reference video stream; and performing video stabilization on the third video stream based at least in part on the second target disparity map to generate a stabilized third video stream.

9. The method of claim 1, further comprising: determining the reference view corresponds to the viewer; and setting the reference video stream based on the reference view corresponding to the viewer.

10. The method of claim 9, wherein determining the reference view corresponds to the viewer comprises at least one of head tracking, eye tracking, or gaze tracking.

11. A system for providing multiview video stabilization comprising:
a memory configured to store multiview video comprising a plurality of synchronized input video streams from a corresponding plurality of cameras; and
a processor coupled to the memory, the processor to:
attain the multiview video;
select a reference view of the synchronized input video streams, wherein the reference view corresponds to an observed view of a viewer;
perform single view video stabilization, to compensate for video jitter, on a reference video stream, corresponding to the reference view, of the plurality of synchronized input video streams to generate a stabilized reference video stream, wherein to perform the single view video stabilization comprises the processor to apply a stabilization transform to a frame of the reference video stream to generate a stabilized frame of the stabilized reference video stream;

detect a plurality of locations of stabilized feature points from the stabilized frame;

propagate the single view video stabilization to a second video stream of the plurality of synchronized input video streams, wherein the processor to propagate the single view video stabilization comprises the processor to generate a target disparity map based on application of the stabilization transform to an initial disparity map for the frame of the reference video stream and a synchronized frame of the second video stream and minimization of at least a vertical component or a horizontal component of the target disparity map, the target disparity map comprising a plurality of disparity vectors, to determine locations for synchronized stabilized feature points of a synchronized stabilized frame of the second video stream corresponding to the stabilized frame by determining the locations for the synchronized stabilized feature points that minimize an energy term comprising a plurality of differences between the locations of the synchronized stabilized feature points and sums of corresponding locations of the stabilized feature points of the stabilized frames and corresponding disparity vectors of the target disparity map, and to perform video stabilization on the second video stream by warping the synchronized frame using the synchronized stabilized feature points to generate a synchronized stabilized frame of a stabilized second video stream; and a display to present stabilized multiview video comprising at least the stabilized second video stream to the viewer.

12. The system of claim 11, wherein the minimization of the vertical or horizontal component comprises the processor to set the vertical or horizontal component for each position of the target disparity map to zero, wherein the vertical component is set to zero when the reference video stream and the second video stream are horizontally aligned and the horizontal component is set to zero when the reference video stream and the second video stream are vertically aligned.

13. The system of claim 11, wherein the processor is further to partition the plurality of synchronized input video streams into a plurality of subsets of synchronized streams of multiview video, wherein the reference video stream is in a first subset and the second video stream is in a second subset, and to propagate the single view video stabilization to a third video stream in a third subset of the plurality of subsets of synchronized streams.

14. The system of claim 13, wherein the processor is further to propagate video stabilization from the second video stream to one or more other video streams in the second subset and propagate video stabilization from the third video stream to one or more other video streams in the third subset at least partially in parallel to the propagation of the video stabilization from the second video stream to the one or more other video streams in the second subset.

15. The system of claim 11, wherein the processor is further to propagate the single view video stabilization to a third video stream, wherein the processor to propagate the single view video stabilization to the third video stream comprises the processor to generate a second target disparity map based on application of the stabilization transform to a second initial disparity map for the frame of the reference video and a synchronized frame of a fourth video stream and the processor to set a vertical component of the second target disparity map based on the stabilization transformed second disparity map and a horizontal component of the second target disparity map based on the stabilization transformed disparity map, wherein the second video stream is horizontally aligned with the reference video stream, the fourth video stream is vertically aligned with the reference video stream, and the third video stream is diagonally aligned with the reference video stream, and to perform video stabilization on the third video stream based at least in part on the second target disparity map to generate a stabilized third video stream.

16. The system of claim 11, wherein the processor is further to determine the reference view corresponds to the viewer of the multiview video and to set the reference video stream based on the reference view corresponding to the viewer.

17. At least one non-transitory machine readable medium comprising a plurality of instructions that, in response to being executed on a device, cause the device to provide multiview video stabilization by:

attaining input multiview video comprising a plurality of synchronized input video streams from a corresponding plurality of cameras;

selecting a reference view of the synchronized input video streams, wherein the reference view corresponds to an observed view of a viewer;

performing single view video stabilization, to compensate for video jitter, on a reference video stream, corresponding to the reference view, of the plurality of synchronized input video streams to generate a stabilized reference video stream, wherein performing the single view video stabilization comprises applying a stabilization transform to a frame of the reference video stream to generate a stabilized frame of the stabilized reference video stream;

detecting a plurality of locations of stabilized feature points from the stabilized frame;

propagating the single view video stabilization to a second video stream of the plurality of synchronized input video streams by:

generating a target disparity map by applying the stabilization transform to an initial disparity map for the frame of the reference video stream and a synchronized frame of the second video stream and by minimizing at least a vertical component or a horizontal component of the target disparity map, the target disparity map comprising a plurality of disparity vectors;

determining locations for synchronized stabilized feature points of a synchronized stabilized frame of the second video stream corresponding to the stabilized frame by determining the locations for the synchronized stabilized feature points that minimize an energy term comprising a plurality of differences between the locations of the synchronized stabilized feature points and sums of corresponding locations of the stabilized feature points of the stabilized frames and corresponding disparity vectors of the target disparity map; and performing video stabilization on the second video stream by warping the synchronized frame using the synchronized stabilized feature points to generate a synchronized stabilized frame of a stabilized second video stream; and presenting stabilized multiview video comprising at least the stabilized second video stream to the viewer.

18. The machine readable medium of claim 17, wherein minimizing the vertical or horizontal component comprises setting the vertical or horizontal component for each position of the target disparity map to zero, and wherein the vertical component is set to zero when the reference video stream and the second video stream are horizontally aligned and the horizontal component is set to zero when the reference video stream and the second video stream are vertically aligned.

19. The machine readable medium of claim 17, further comprising a plurality of instructions that, in response to being executed on the device, cause the device to provide multiview video stabilization by: partitioning a plurality of synchronized streams of multiview video into a plurality of subsets of synchronized streams of multiview video, wherein the reference video stream is in a first subset and the second video stream is in a second subset; and propagating the single view video stabilization to a third video stream in a third subset of the plurality of subsets of synchronized streams.

20. The machine readable medium of claim 19, further comprising a plurality of instructions that, in response to being executed on the device, cause the device to provide multiview video stabilization by: propagating video stabilization from the second video stream to one or more other video streams in the second subset; and propagating video stabilization from the third video stream to one or more other video streams in the third subset at least partially in parallel to the propagation of the video stabilization from the second video stream to the one or more other video streams in the second subset.

21. The machine readable medium of claim 17, further comprising a plurality of instructions that, in response to being executed on the device, cause the device to provide multiview video stabilization by: propagating the single view video stabilization to a third video stream by: generating a second target disparity map by applying the stabilization transform to a second initial disparity map for the frame of the reference video and a synchronized frame of a fourth video stream and by setting a vertical component of the second target disparity map based on the stabilization transformed second disparity map and a horizontal component of the second target disparity map based on the stabilization transformed disparity map, wherein the second video stream is horizontally aligned with the reference video stream, the fourth video stream is vertically aligned with the reference video stream, and the third video stream is diagonally aligned with the reference video stream; and performing video stabilization on the third video stream based at least in part on the second target disparity map to generate a stabilized third video stream.

22. The machine readable medium of claim 17, further comprising a plurality of instructions that, in response to being executed on the device, cause the device to provide multiview video stabilization by: determining the reference view corresponds to the viewer; and setting the reference video stream based on the reference view corresponding to the viewer.

* * * * *